United States Patent
Takase

(10) Patent No.: US 6,289,473 B1
(45) Date of Patent: Sep. 11, 2001

(54) SEMICONDUCTOR DEVICE HAVING A DEBUG FUNCTION

(75) Inventor: Kazuhiko Takase, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/116,951

(22) Filed: Jul. 17, 1998

(30) Foreign Application Priority Data

Feb. 10, 1998 (JP) .................................................. 10-028526

(51) Int. Cl.$^7$ .......................... H02H 3/05; H03K 19/003
(52) U.S. Cl. .................. 714/35; 714/45; 714/47
(58) Field of Search ................ 714/35, 39, 10, 714/11, 44, 47, 48, 45

(56) References Cited

U.S. PATENT DOCUMENTS

| | | | |
|---|---|---|---|
| 5,361,348 | * 11/1994 | Nakamoto | 714/38 |
| 5,491,793 | * 2/1996 | Somasundaram et al. | 714/45 |
| 5,513,346 | * 4/1996 | Satagopan et al. | 714/48 |
| 5,544,311 | * 8/1996 | Harenberg et al. | 714/40 |
| 5,828,824 | * 10/1998 | Swoboda | 714/25 |
| 6,065,078 | * 5/2000 | Falik et al. | 710/100 |

FOREIGN PATENT DOCUMENTS

P04-38533  3/1980  (JP) .
P55-33257  2/1992  (JP) .

OTHER PUBLICATIONS

MIPS RISC Architecture, published by Prentice Hall, Chapter 5, Exception Processing, pp. 5–1.

* cited by examiner

Primary Examiner—Dieu-Minh Le
(74) Attorney, Agent, or Firm—Burns, Doane, Swecker & Mathis LLP

(57) ABSTRACT

Provided is a semiconductor device capable of dealing with various debug patterns, of knowing whether or not an operation of each module is stopped when debugging is performed, and of retaining or restoring an internal state of the module which is obtained immediately after the stop. The semiconductor device includes a CPU (11), a video decoder (12), an audio decoder (13), an IO processor (14) and a memory (15). These modules are connected through a bus line (16) to receive and send a signal therebetween. The CPU (11), the video decoder (12), the audio decoder (13) and the IO processor (14) are connected to a debug control circuit (17) through a group of signal lines (18), respectfully. The debug control circuit (17) outputs a stop signal (S1) and a stop notice signal (S2) indicating that operations of all the modules are stopped.

7 Claims, 4 Drawing Sheets

SEMICONDUCTOR DEVICE HAVING A DEBUG FUNCTION

BACKGROUND OF THE INVENTION

1. Field of the Invention

The present invention relates to a semiconductor device, and more particularly to a system LSI having a debug function.

2. Description of the Background Art

A semiconductor device forming a predetermined system by a combination of a plurality of integrated circuits (modules) having various functions, that is, a system LSI stores software (a program) and hardware (for example, a hard-wired logic) which define an operation thereof. Whether or not the software and the hardware have errors is checked by a debugging operation which is important to a process of developing and manufacturing the system LSI.

FIG. 7 shows a general structure of the system LSI. The system LSI shown in FIG. 7 comprises a CPU (central processing unit) 1, a first processor 2, a second processor 3, an IO (input-output) processor 4 and a memory 5. These modules are connected through a bus line 6, and receive and send a signal therebetween.

An example of the operation of the system LSI will be described below. Data input from the outside is stored in the memory 5 through the IO processor 4. The CPU 1, the first processor 2 and the second processor 3 exchange the input data through the memory 5, perform predetermined processings and finally output the processed data to the outside.

Since the CPU 1, the first processor 2 and the second processor 3 perform processings for the input data at the same time, they operate independently and are mutually synchronized with each other if necessary. For example, in a case where a program stored in the CPU 1 is debugged in such an operating situation, the operation of the CPU 1 is stopped to interrupt a special program for debugging into the CPU 1 and to check the operating state. In this case, it is also necessary to stop the operations of the first processor 2, the second processor 3 and the IO processor 4. For this reason, a stop signal SS is sent from the CPU 1 to these modules.

In the conventional system LSI, thus, an operation of each module is simply stopped in response to the stop signal sent from the CPU 1 simultaneously with the suspension of the operation of the CPU 1. Therefore, the conventional system LSI cannot deal with complicated debug patterns. As described above, each module operates independently. For this reason, it is hard to stop their operations at the same time. The conventional system LSI has not had a structure in which the outside is caused to know whether or not the operations of the first and second processors 2 and 3 are also stopped when the program stored in the CPU 1 is stopped. Therefore, if a program for debugging is input from a microcomputer provided on the outside or the like in order to execute the debugging for the program stored in the CPU 1 in a state in which the first and second processors 2 and 3 continue the operations, the first and second processors 2 and 3 are sometimes broken (on a software or hardware basis).

For example, even if the program stored in the CPU 1 is stopped in a predetermined specific portion to stop the operations of the first and second processors 2 and 3, the operations of the first and second processors 2 and 3 are not stopped immediately but after a predetermined time has passed because they are not generally stopped before a predetermined processing is completed. Accordingly, there have been the following problems. It is impossible to know internal states of the first and second processors 2 and 3 immediately after the operation of the CPU 1 is stopped. Even if the first and second processors 2 and 3 are reactivated to give data or an operation instruction from the CPU 1, the internal states of the first and second processors 2 and 3 progress more than those obtained immediately after the operation of the CPU 1 is stopped so that the first and second processors 2 and 3 are not ready to accept the data or operation instruction. Therefore, they ignore the data or operation instruction sent from the CPU 1 to continue a wrong operation or to cause hang-up. However, each module has not had a structure to eliminate such drawbacks.

SUMMARY OF THE INVENTION

A first aspect of the present invention is directed to a semiconductor device comprising a first processor, at least one second processor for receiving and sending a signal from/to the first processor, and a debug control circuit for outputting a stop signal to give an instruction for stop of an operation during debugging of respective systems to the first processor and the at least one second processor, the at least one second processor being controlled by the first processor and individually operating independently of the first processor, the first processor and the at least one second processor outputting a trigger signal which requires to output the stop signal to the debug control circuit when performing first predetermined specific operations respectively, and outputting a stop detecting signal indicative of stop to the debug control circuit when the operation is stopped in response to the stop signal, and the debug control circuit outputting the stop signal on receipt of the trigger signal, and outputting a stop notice signal indicative of stop of all of the first processor and the at least one second processor if the stop detecting signal is output from all of the first processor and the at least one second processor.

A second aspect of the present invention is directed to the semiconductor device wherein the first processor and the at least one second processor further have a function of bringing, into a significant condition, and outputting one of a trigger excluding signal negating that the stop signal is brought into a significant condition and a trigger accepting signal permitting the stop signal to be brought into a significant condition to the debug control circuit when the first processor and the at least one second processor perform predetermined specific second operation other than the first specific operation, respectively, and the debug control circuit further has functions of negating that the stop signal is brought into a significant condition even if it receives the trigger signal in a case where the trigger excluding signal is input, and bringing the stop signal into a significant condition on receipt of the trigger signal in a case where the trigger accepting signal is input.

A third aspect of the present invention is directed to the semiconductor device wherein the debug control circuit comprises a first circuit for receiving the trigger signals output from the first processor and the at least one second processor, and for bringing, into a significant condition, and outputting a first signal if at least one of the trigger signals is in a significant condition, a second circuit for receiving the trigger accepting signals output from the first processor and the at least one second processor, and for bringing, into a significant condition, and outputting a second signal if at least one of the trigger accepting signals is in a significant condition, a third circuit for receiving the trigger excluding signals output from the first processor and the at least one second processor, and for bringing, into a significant condition, and outputting a third signal if at least one of the trigger excluding signals is in a significant condition, a fourth circuit for receiving the stop detecting signals output from the first processor and the at least one second processor, and for bringing, into a significant condition, and outputting a fourth signal if all of the stop detecting signals are in a significant condition, a fifth circuit for receiving the second and third signals, and for outputting a trigger acceptance deciding signal which is brought into a significant condition when the second signal is in a significant condition and into a nonsignificant condition when the third signal is in a significant condition, a sixth circuit for receiving the first signal and the trigger acceptance deciding signal, and for bringing, into a significant condition, and outputting the stop signal when both the first signal and the trigger acceptance deciding signal are in a significant condition, and a seventh circuit for receiving the stop signal and the fourth signal, and for bringing, into a significant condition, and outputting the stop notice signal when both the stop signal and the fourth signal are in a significant condition.

A fourth aspect of the present invention is directed to the semiconductor device wherein the debug control circuit comprises a first circuit for receiving the trigger signals output from the first processor and the at least one second processor, for performing an operation of coincidence of the trigger signal with a preset value, and for bringing, into a significant condition, and outputting a first signal if the trigger signal is coincident with the preset value, a second circuit for receiving the trigger accepting signals output from the first processor and the at least one second processor, and for bringing, into a significant condition, and outputting a second signal if at least one of the trigger accepting signals is in a significant condition, a third circuit for receiving the trigger excluding signals output from the first processor and the at least one second processor, and for bringing, into a significant condition, and outputting a third signal if at least one of the trigger excluding signals is in a significant condition, a fourth circuit for receiving the stop detecting signals output from the first processor and the at least one second processor, and for bringing, into a significant condition, and outputting a fourth signal if all of the stop detecting signals are in a significant condition, a fifth circuit for receiving the second and third signals, and for outputting a trigger acceptance deciding signal which is brought into a significant condition when the second signal is in a significant condition and into a nonsignificant condition when the third signal is in a significant condition, a sixth circuit for receiving the first signal and the trigger acceptance deciding signal, and for bringing, into a significant condition, and outputting the stop signal when both the first signal and the trigger acceptance deciding signal are in a significant condition, and a seventh circuit for receiving the stop signal and the fourth signal, and for bringing, into a significant condition, and outputting the stop notice signal when both the stop signal and the fourth signal are in a significant condition.

A fifth aspect of the present invention is directed to the semiconductor device wherein the first circuit comprises a register to which the preset value is input, and an operation part for comparing the trigger signal with the preset value, the operation part having a plurality of exclusive NOR gates provided on the first processor and the at least one second processor with a one-to-one correspondence, and an AND gate for receiving outputs of the exclusive NOR gates, the register having a plurality of data holding elements provided on the first processor and the at least one second processor with a one-to-one correspondence, and the exclusive NOR gates receiving the trigger signals from the first processor and the at least one second processor with a one-to-one correspondence, and receiving outputs of the data holding elements of the register with a one-to-one correspondence.

A sixth aspect of the present invention is directed to the semiconductor device wherein the at least one second processor has at least one pair of a first register for temporarily holding data to be processed, and a processing circuit connected to the first register for receiving and processing the data, and a second register connected to an output of the first register in parallel with the processing circuit, the data transferred from the first register to the processing circuit being also written to the second register in a timing in which the stop signal is sent.

A seventh aspect of the present invention is directed to the semiconductor device further comprising output selecting means provided in a path transmitting the data to the first register, for receiving an output of the second register together with the data to select and output one of them, the data written to the second register being written as restored data to the first register in response to a restoring signal sent in a predetermined timing.

According to the first aspect of the present invention, when performing respective predetermined first specific operations, the first processor and the at least one second processor output, to the debug control circuit, the trigger signal for requiring the output of the stop signal to give a debug request so that the debug control circuit outputs the stop signal by the request. The first processor and the at least one second processor output, to the debug control circuit, the stop detecting signal indicative of stop if they stop operations in response to the stop signal, and the debug control circuit outputs the stop notice signal indicating that all of the first processor and the at least one second processor stop the operations if the stop detecting signal is output from all of the first processor and the at least one second processor. Therefore, even if the at least one second processor individually operates independently and a time taken from the input of the stop signal to the stop has a variation, an external device for performing a debug work such as a microcomputer can perform the debug work after confirming that all of the first processor and the at least one second processor stop operations. In a case where the debugging is performed in a state in which any processor does not completely stop an operation, it is possible to prevent the processor from being broken.

According to the second aspect of the present invention, the first processor and the at least one second processor also have the function of outputting the trigger excluding signal and the trigger accepting signal. Therefore, it is possible to take the conditions for outputting the trigger excluding signal and the trigger accepting signal into consideration in addition to the conditions for outputting the trigger signal, to process more complicated stop conditions, and to deal with a case where an operation linked to each processor is performed.

According to the third aspect of the present invention, it is possible to obtain a debug control circuit which has a simple structure and can take the conditions for outputting the trigger excluding signal and the trigger accepting signal into consideration in addition to the condition for outputting the trigger signal.

According to the fourth aspect of the present invention, the debug control circuit includes the first circuit for performing an operation of coincidence of the trigger signal with the preset value, and bringing, into a significant condition, and outputting the first signal if the trigger signal is coincident with the preset value. Consequently, the stop signal can be brought into a significant condition under more complicated conditions.

According to the fifth aspect of the present invention, the set value of the register is varied so that the logical operation can optionally be changed to easily deal with various debug patterns.

According to the sixth aspect of the present invention, the second register is provided in the succeeding stage of the first register. For example, consequently, data can be retained when the stop signal is brought into a significant condition and the internal state of the second processor obtained when the stop signal is brought into the significant condition can be known.

According to the seventh aspect of the present invention, the second register is provided in the succeeding stage of the first register to retain the data obtained when the stop signal is brought into the significant condition, for example. If the second processor should be reactivated, the data is written to the first register so that the data obtained when the stop signal is brought into the significant condition can be restored. Therefore, in a case where the second processor is reactivated, the instruction sent from the first processor coincides with the internal state of the second processor so that it is possible to prevent the data or operation instruction sent from the first processor from being ignored to continue a wrong operation or to cause hang-up.

In order to solve the above-mentioned problems, it is an object of the present invention to provide a semiconductor device capable of dealing with various debug patterns, of knowing whether or not all modules stop operations when debugging is performed, and of retaining or restoring an internal state of each module obtained immediately after the stop.

These and other objects, features, aspects and advantages of the present invention will become more apparent from the following detailed description of the present invention when taken in conjunction with the accompanying drawings.

DESCRIPTION OF THE PREFERRED EMBODIMENTS

<A. First Embodiment>
<A-1. Structure of Device>

Figure 1:
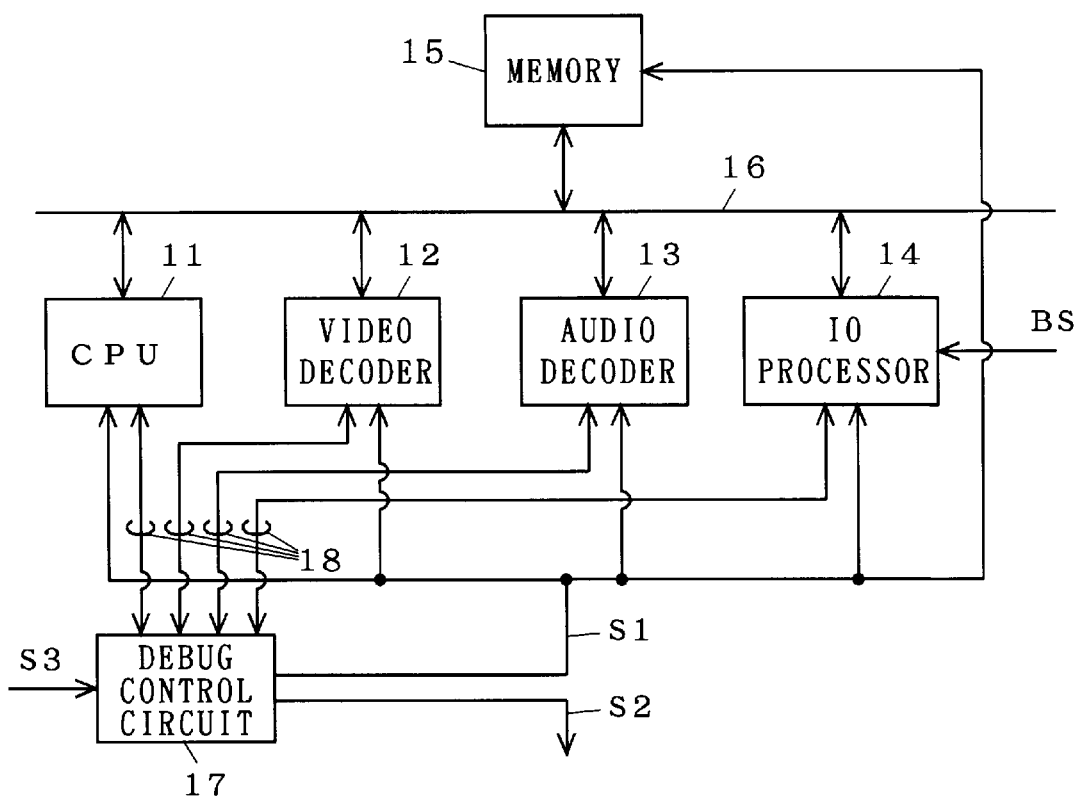
FIG. 1 is a block diagram illustrating a whole structure of a semiconductor device according to the present invention.

An audio image processor according to a first embodiment of the present invention will be taken as an example for the following description. FIG. 1 is a block diagram showing a structure of the audio image processor.

As shown in FIG. 1, the audio image processor comprises a CPU (central processing unit) 11, a video decoder 12, an audio decoder 13, an IO (input-output) processor 14, and a memory 15. These modules are connected through a bus line 16, and receive and send a signal therebetween. The CPU 11, the video decoder 12, the audio decoder 13 and the IO processor 14 are connected to a debug control circuit 17 through a group of signal lines 18, respectively. The debug control circuit 17 sends a stop signal S1 to the CPU 11, the video decoder 12, the audio decoder 13, the IO processor 14 and the memory 15. Furthermore, the debug control circuit 17 outputs a stop notice signal S2 indicating that all the modules have stopped operations to the outside of the audio image processor. A debug canceling signal S3 is sent from the outside of the audio image processor to the debug control circuit 17.

<A-1-1. Structure of Debug Control Circuit>

Figure 2:
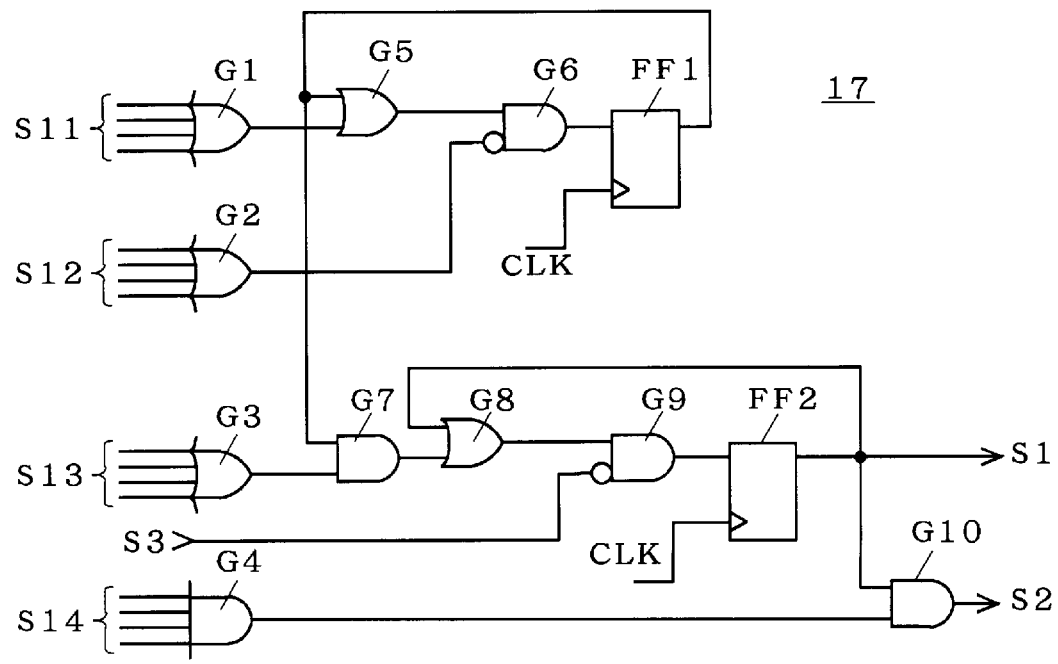
FIG. 2 is a diagram illustrating a partial structure of a semiconductor device according to a first embodiment of the present invention.

A structure of the debug control circuit 17 will be described below with reference to FIG. 2. The debug control circuit 17 includes OR gates G1 (a second circuit), G2 (a third circuit) and G3 (a first circuit), and an AND gate G4 (a fourth circuit) to which an arm condition signal S11, a disarm condition signal S12, a trigger condition signal S13 and a stop detecting signal 14 are sent from the CPU 11, the video decoder 12, the audio decoder 13 and the IO processor 14, respectively. The arm condition signal S11, the disarm condition signal S12, the trigger condition signal S13 and the stop detecting signal S14 are sent through the group of signal lines 18.

An output of the OR gate G1 is input to an OR gate G5, an output of the OR gate G2 is sent to an inversion input of an AND gate G6, an output of the OR gate G3 is input to an AND gate G7, and an output of the AND gate G4 is input to an AND gate G10. An output of the AND gate G6 is input to an arm signal holding flip-flop FF1, and an output of the arm signal holding flip-flop FF1 is input to the OR gate G5 and the AND gate G7. The arm signal holding flip-flop FF1 serves to decide whether or not the trigger condition signal S13 is accepted. Therefore, the output of the arm signal holding flip-flop FF1 can be referred to as a trigger acceptance deciding signal.

An output of the AND gate G7 is input to an OR gate G8, an output of the OR gate G8 is input to an AND gate G9, and an output of the AND gate G9 is input to a flag flip-flop FF2. An output of the flag flip-flop FF2 is sent as the stop signal S1 to each module, and is input to the OR gate G8 and the AND gate G10, and an output of the AND gate G10 is output as the stop notice signal S2 to the outside of the audio image processor. The debug canceling signal S3 is sent from the outside of the audio image processor to an inversion input of the AND gate G9. The flip-flops FF1 and FF2 are formed of a D (data) flip-flop or a T (toggle) flip-flop which is synchronized with a clock signal CLK.

The trigger condition signal S13 is output from each module when a predetermined specific event is generated in the module. For example, when a program proceeds to execute a predetermined specific instruction (that is, a trigger condition is met), the trigger condition signal S13 is output from the CPU 11. Furthermore, when other modules perform predetermined specific data processings (that is, the trigger condition is met), the trigger condition signal S13 is output therefrom, respectively. The trigger condition is preset for each module.

The arm condition signal S11 permits the stop signal S1 to be brought into a significant condition when the trigger condition signal S13 is brought into the significant condition. In other words, the arm condition signal S11 is a trigger condition accepting signal. Referring to a structure shown in FIG. 2, accordingly, when any of the trigger condition signals S13 is brought into the significant condition, the stop signal S1 is brought into the significant condition if any of the arm condition signals S11 is in the significant condition.

The disarm condition signal S12 serves to negate that the stop signal S1 is brought into the significant condition even if the trigger condition signal S13 is brought into the significant condition. In other words, the disarm condition signal S12 is a trigger condition excluding signal. Referring to the structure shown in FIG. 2, accordingly, even if any of the trigger condition signals S13 is brought into the significant condition, the stop signal S1 is brought into a nonsignificant condition if any of the disarm condition signals S12 is in the significant condition. In a case where at least one of the arm condition signals S11 is in the significant condition, all the disarm condition signals S12 are brought into the nonsignificant condition, and so is a reverse case. The arm condition signal S11 and the disarm condition signal S12 will be described below in detail.

The stop detecting signal S14 indicates that each module stops an operation.

The OR gate G3, the OR gate G1, the OR gate G2 and the AND gate G4 will be hereinafter referred to as first, second, third and fourth circuits, respectively. A circuit formed by the OR gate G5, the AND gate G6 and the flip-flop FF1 can be referred to as a fifth circuit which receives second and third signals output from the second and third circuits respectively, and outputs a trigger acceptance deciding signal that is brought into a significant condition when the second signal is in the significant condition, and is brought into a nonsignificant condition when the third signal is in the significant condition. A circuit formed by the AND gate G7, the OR gate G8, the AND gate G9 and the flip-flop FF2 can be referred to as a sixth circuit which receives the first signal and the trigger acceptance deciding signal output from the first and fifth circuits respectively, and brings, into the significant condition, and outputs a stop signal when both the first signal and the trigger acceptance deciding signal are in the significant condition. The AND gate G10 can be referred to as a seventh circuit which receives the stop signal and a fourth signal output from the fourth circuit, and brings, into the significant condition, and outputs a stop notice signal when both the stop signal and the fourth signal are in the significant condition.

<A-2. Operation of Device>
<A-2-1. Basic Operation>

Next, a basic operation of the audio image processor will be described. The audio image processor serves to decompress multiplexed audio image information input from the outside, and to convert the decompressed audio image information into voice data, image data or character data which can be recognized by men, and to output the voice data, the image data or the character data. For simplicity, only processings of the voice information and the image information will be described below.

First of all, a data row (bit stream) BS of the compressed and multiplexed voice image information is input from the outside, and is then stored temporarily in a predetermined region of the memory 15. The CPU 11 reads a part of the stored bit stream BS from the memory 15, separates the read bit stream BS into voice information and image information to be written to the memory 15. The CPU 11 repeats this operation.

The video decoder 12 reads the image information from the memory 15, decompresses the read image information, expands the decompressed image information into image data, and writes the image data to the memory 15. The audio decoder 13 reads the voice information from the memory 15, decompresses the voice information, expands the decompressed voice information into voice data, and writes the voice data to the memory 15. The 10 processor 14 reads the image data and the voice data from the memory 15, and outputs them to the outside. These operations are executed at almost the same time. Respective modules operate independently except a case where they are synchronized to operate.

Debugging will be described below. The system LSI stores software (a program) and hardware (for example, a hard-wired logic) which define an operation thereof. Whether or not the software and the hardware have errors is checked by the debugging. In a case where a program stored in the module is not correctly executed or is not executed according to a design, the debugging of the software is performed. As a representative of the module whose operation is defined by the program, a CPU will be taken as an example for the following description. The program is constituted by an instruction string. The CPU 11 executes instructions one after another, thereby performing a predetermined operation. The debugging of the program is executed to confirm whether or not the instructions have troubles and to specify a portion of the program which has troubles. For example, the program has each instruction to which a program address is added. At a stage in which the program proceeds to execute an instruction having a predetermined specific program address (before or after a malfunction occurs, for example), the program is stopped to halt the operation of the CPU 11. At that time, an internal state of a register and an output of the signal line are confirmed or a special program for debugging is interrupted. Thus, the instruction and the internal state are changed to check the operating state.

The debugging of the hardware is as follows. In cases where the operation of the module is defined by the hard-wired logic, for example, and where the operation is not correctly performed or is not performed according to a design, the hard-wired logic is analyzed to investigate the cause of disorders. For example, the operation of the module is stopped before and after the malfunction occurs. At that time, the internal state of the register and the output of the signal line are confirmed and the hard-wired logic is changed depending on circumstances. Thus, the operating state is checked.

<A-2-2. Example of Operation for Debugging CPU>

As an example of debugging, there will be described a case where whether or not the CPU 11 of the audio image processor normally operates is checked.

The CPU 11 includes a mechanism for bringing (asserting), into a significant condition, the trigger condition signal S13 output from the CPU 11 in order to stop the program at a stage in which a stored program proceeds to execute an instruction having a predetermined specific program address. Since a general program address detector for detecting a program address is provided in the CPU 11, its description will be omitted.

Accordingly, when the stored program proceeds to reach the predetermined specific program address, the trigger condition signal S13 of the CPU 11 is brought into the significant condition and the output of the OR gate G3 is brought into the significant condition.

The present invention is intended for only the debugging of the CPU 11 for convenience, and does not take an operation linked to other modules into consideration.

Therefore, an arm condition, a disarm condition and the like which are important in consideration of the operation linked to other modules are not considered. More specifically, the arm condition signal S11 is set all the time and the disarm condition signal S12 is reset all the time. Accordingly, the output of the OR gate G1 is brought into the significant condition, the output of the OR gate G2 is brought into the nonsignificant condition and the output of the AND gate G6 is brought into the significant condition so that the arm signal holding flip-flop FF1 is set.

In a case where the trigger condition signal S13 is in the significant condition and the arm signal holding flip-flop FF1 is set, the outputs of the AND gate G7 and the OR gate G8 are brought into the significant condition. At this time, the debug canceling signal S3 is in the nonsignificant condition as a matter of course. Therefore, the output of the AND gate G9 is brought into the significant condition so that the flag flip-flop FF2 is set. In other words, the stop signal S1 is brought into the significant condition.

Each module receiving the stop signal S1 operates for a predetermined period therein, and is then brought into a stop condition so that the stop detecting signal S14 is brought into the significant condition. Each module has a structure in which it receives the stop signal S1 and then continues an operation for a predetermined period in order to keep a state in which reactivation can be performed. However, since this structure is general, its description will be omitted. Since the skilled in the art can easily analogize the structure in which the stop detecting signal S14 is brought into the significant condition when each module stops an operation, description will be omitted. The stop signal S1 is sent to a clock signal control section of each module, and operates to stop the clock signal, thereby halting the operation of the module.

When the stop detecting signals S14 sent from all the modules are brought into the significant condition, the output of the AND gate G4 is brought into the significant condition so that the output of the AND gate G10, that is, the stop notice signal S2 is brought into the significant condition. An external debugging device (a microcomputer which is not shown, or the like) having known that the stop notice signal S2 is brought into the significant condition starts the debugging operation.

While the example in which the operations of other modules are stopped to debug the program stored in the CPU 11 has been described above, the video decoder 12, the audio decoder 13 and the IO processor 14 also store programs for individual operations and operate according to the hard-wired logic. Therefore, it is needless to say that the operation of the CPU 11 can also be stopped to debug the stored programs and the hard-wired logic.

More specifically, if the video decoder 12, the audio decoder 13 and the IO processor 14 are set in such a manner that the trigger condition signal S13 is brought into the significant condition when a predetermined specific program is reached, that is, a predetermined specific processing is performed, the operation of each module can be stopped through the same process as described above.

If it is not necessary to take the arm condition and the disarm condition into consideration, the OR gates G1, G2 and G5, the AND gate G6, the arm signal holding flip-flop FF1 and the AND gate G7 are not required. With a structure in which the output of the OR gate G3 is input to the OR gate G8, the debug control circuit can be simplified.

<A-2-3. Example of Debugging Taking Arm Condition and Disarm Condition into Consideration>

Next, a case where the debugging is performed in consideration of the arm condition and the disarm condition will be described. For example, in a case where a program stored in the CPU 11 is subjected to debugging, operations of the video decoder 12, the audio decoder 13, the IO processor 14 and the memory 15 are also stopped. When an internal state of the video decoder 12 is in a specific condition A, it is set that the disarm condition signal S12 output from the video decoder 12 is brought into the significant condition if the operation of the video decoder 12 should not be stopped. In this case, it is set that the arm condition signal S11 output from the video decoder 12 is brought into the significant condition when the internal state of the video decoder 12 is in a condition other than the specific condition A. The arm condition and the disarm condition are not particularly set to the audio decoder 13 and the IO processor 14, and the arm condition signal S11 and the disarm condition signal S12 output from the audio decoder 13 and the IO processor 14 respectively are in the nonsignificant condition.

In such a case, even if the program stored in the CPU 11 proceeds to reach a predetermined specific program address and the trigger condition signal S13 of the CPU 11 is brought into the significant condition, the arm signal holding flip-flop FF1 and the flag flip-flop FF2 are reset, and the stop signal S1 is brought into the nonsignificant condition so that none of all the modules including the video decoder 12 stops the operation because the disarm condition signal S12 is in the significant condition if the internal state of the video decoder 12 is in the specific condition A.

However, if the internal state of the video decoder 12 is not in the specific condition A and the program stored in the CPU 11 reaches the predetermined specific program address again, the disarm condition signal S12 of the video decoder 12 is brought into the nonsignificant condition and the arm condition signal S11 is brought into the significant condition so that the arm signal holding flip-flop FF1 and the flag flip-flop FF2 are set and the stop signal S1 is brought into the significant condition so that the operations of all the modules including the video decoder 12 are stopped.

For example, in a case where the video decoder 12 periodically repeats specific conditions A, B, C, D, A, B . . . , it is set that the arm condition signal S11 is brought into the significant condition when the video decoder 12 is brought into the specific condition A, and that the disarm condition signal S13 is brought into the significant condition when the video decoder 12 is brought into the specific condition C. By such setting, when the CPU 11 executes an instruction having a predetermined specific program address to bring the trigger condition signal S13 into the significant condition, the trigger condition signal S13 is accepted so that the stop signal S1 is brought into the significant condition if the video decoder 12 is in the specific conditions A and B, and the trigger condition signal S13 is ignored so that the stop signal S1 is not brought into the significant condition if the video decoder 12 is in the specific conditions C and D. Thus, the arm condition signal S11 and the disarm condition signal S13 are combined and used so that a period for accepting the trigger condition signal S13 can be restricted.

Consequently, the arm condition and the disarm condition are used when the modules perform operations linked therebetween and more complicated stop conditions should be set.

It is preferable that mechanisms for outputting the arm condition signal S11 and the disarm condition signal S12 should be the same as the mechanism for outputting the trigger condition signal S13 and should be preset to output the arm condition signal S11 and the disarm condition signal S12 when the stored program reaches the predetermined specific program address.

<A-3. Structure and Operation for Retaining Internal State of Module>

Next, there will be described a structure in which the internal state of the video decoder or the audio decoder that is obtained immediately after the operation of the CPU is stopped is retained when debugging is performed.

Figure 3:
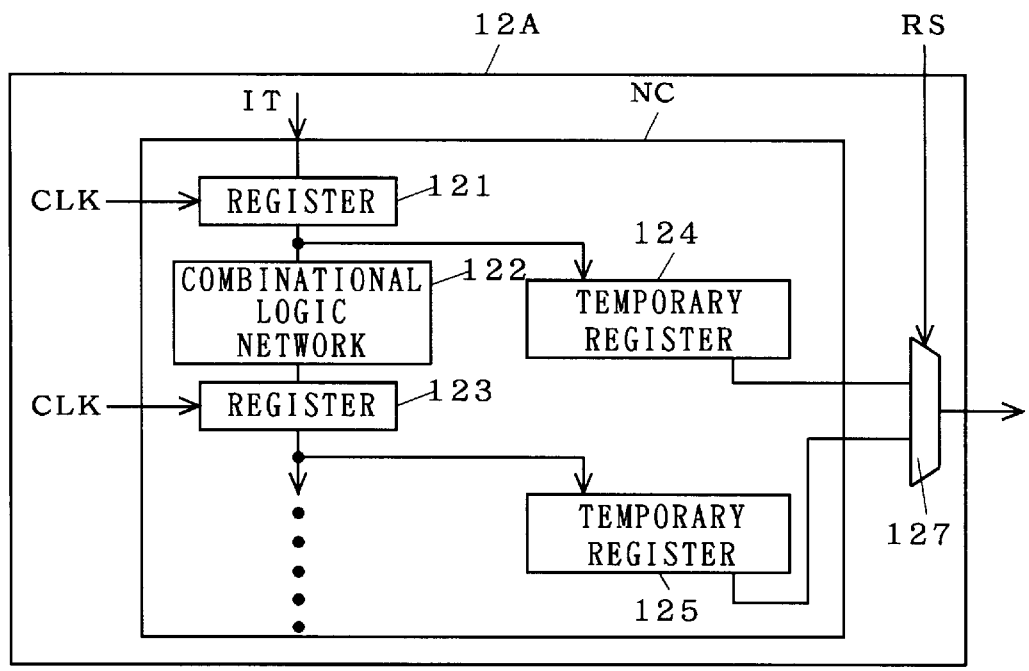
FIG. 3 is a block diagram illustrating a partial structure of the semiconductor device according to the present invention.

FIG. 3 is a block diagram showing a partial structure of a video decoder 12A. A decoder such as a video decoder has an internal circuit having a large number of registers and combinational logic networks provided alternately, and performs an operation such as decompression of data in this portion. FIG. 3 shows a part of an internal circuit NC in which a register 121 is connected to an input terminal IT, an output of the register 121 is connected to an input of a combinational logic network 122, and an output of the combinational logic network 122 is connected to an input of a register 123. The combinational logic network 122 is shown as an example. A processing circuit for performing a predetermined data processing is not restricted to the combinational logic network.

The output of the register 121 is also connected to an input of a temporary register 124, and an output of the register 123 is also connected to an input of a temporary register 125. Outputs of the temporary registers 124 and 125 are connected to a selector (output selecting means) 127. The registers 121 and 123 operate in response to a clock signal CLK, and causes either of the temporary registers 124 and 125 to output a signal in response to a read signal RS. The output of the register 123 is connected to a succeeding combinational logic network which is not shown.

Next, operation will be described. It is assumed that the video decoder 12A has a structure in which it can stop an operation when the clock signal CLK passes 1 cycle after the stop signal S1 is brought into the significant condition, that is, the operation of the CPU 11 is stopped. Data input from the input terminal IT is set to the register 121 in 1 cycle of the clock signal CLK, is sent to the combinational logic network 122 to perform a predetermined processing, and is then sent to the register 123.

Accordingly, when the clock signal CLK passes 1 cycle after the operation of the CPU 11 is stopped, data held in the register 121 when the operation of the CPU 11 is stopped is moved to the register 123. However, the data held in the register 121 is written to the temporary register 124 in a timing in which the stop signal S1 is sent. Therefore, the data held in the register 121 when the operation of the CPU 11 is stopped can be known by reading the data of the temporary register 124.

Similarly, data held in the register 123 when the operation of the CPU 11 is stopped, that is, a result of the processing performed by the combinational logic network 122 is sent to a succeeding combinational logic network, and is also written to the temporary register 125. Therefore, the data held in the register 123 when the operation of the CPU 11 is stopped can be known by reading the data of the temporary register 125.

In order to read the data of the temporary registers 124 and 125, it is preferable that the read signal RS should be sent to the selector 127 to obtain data of a desired register.

Thus, the temporary register is provided in a succeeding stage of the register generally included in the video decoder 12A. Consequently, data can be retained when the operation of the CPU 11 is stopped so that it is possible to know the internal state of the video decoder 12A obtained when the operation of the CPU 11 is stopped.

While the example in which the temporary registers 124 and 125 are connected to only the registers 121 and 123 provided before and after the combinational logic network 122 has been described above, the temporary register may be connected to each register because a plurality of combinational logic networks and registers are provided as in the foregoing.

On the contrary, the temporary register may be connected to only the register connected to the input terminal IT, that is, the register 121. The reason is that data of other registers can be guessed from the structure of the combinational logic network if the data of the register 121 can be obtained.

Accordingly, if the minimum information necessary for knowing the internal state obtained when the operation of the CPU 11 is stopped can be given, it is apparent that a place for connection of the temporary register and the number of the temporary registers are not particularly restricted.

It is needless to say that the internal state obtained when the operation of the CPU 11 is stopped can be known by causing the audio decoder, the IO processor and the like to have the same structures.

<A-4. Structure and Operation for Restoring Internal State of Module>

Next, there will be described a structure for restoring an internal state of a video decoder or an audio decoder which is obtained immediately after the operation of the CPU is stopped when debugging is performed.

Figure 4:
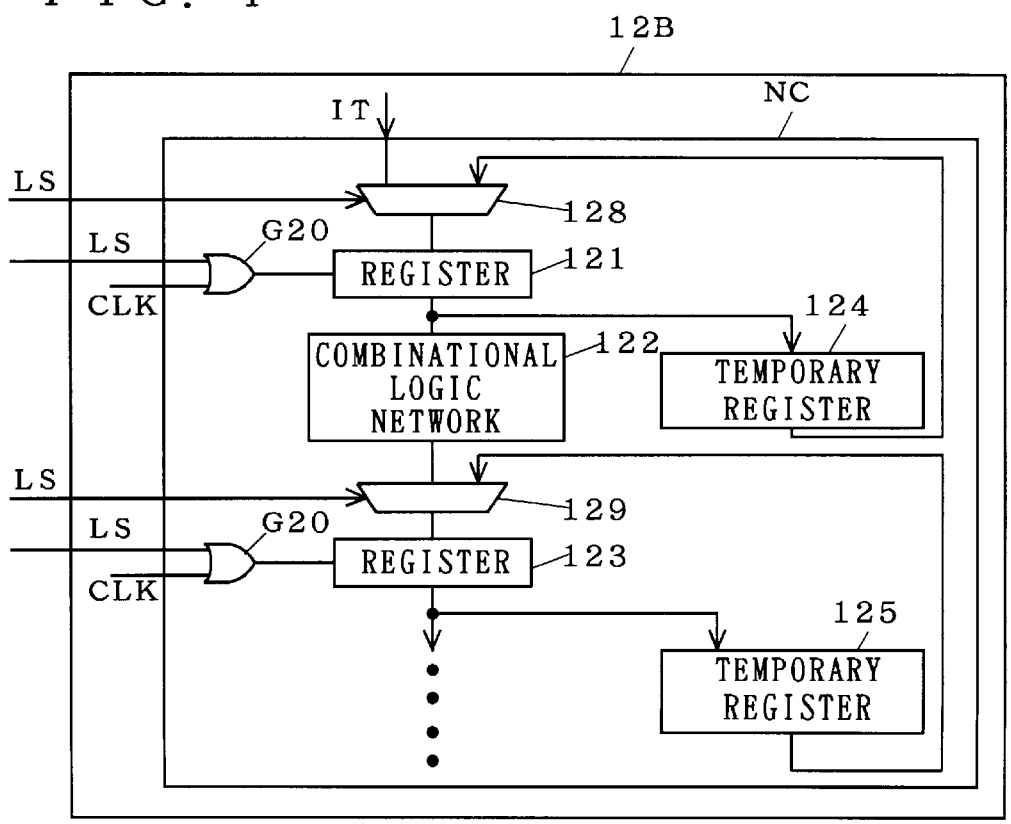
FIG. 4 is a block diagram illustrating a partial structure of the semiconductor device according to the present invention.

FIG. 4 is a block diagram showing a partial structure of a video decoder 12B. The same components as in the video decoder 12A which have been described with reference to FIG. 3 have the same designations, and their repetitive description will be omitted.

In FIG. 4, an input terminal IT is connected to an input of a selector (output selecting means) 128, a register 121 is connected to an output of the selector 128, an output of the register 121 is connected to an input of a combinational logic network 122, an output of the combinational logic network 122 is connected to an input of a selector (output selecting means) 129, and an output of the selector 129 is connected to an input of a register 123.

Outputs of temporary registers 124 and 125 are connected to the inputs of the selectors 128 and 129, respectively. The selectors 128 and 129 select and output only one of inputs in response to a restoring signal LS. Output control of the registers 121 and 123 is performed in response to an output signal of an OR gate G20 to which a clock signal CLK and the restoring signal LS are input.

Operation will be described below. The video decoder 12B has a structure in which it can stop an operation when the clock signal CLK passes 1 cycle after the stop signal S1 is brought into the significant condition, that is, the operation of the CPU 11 is stopped. Data input from the input terminal IT is set to the register 121 in 1 cycle of the clock signal CLK, is sent to the combinational logic network 122 to perform a predetermined processing, and is then sent to the register 123.

Accordingly, when the clock signal CLK passes 1 cycle after the operation of the CPU 11 is stopped, data held in the register 121 when the operation of the CPU 11 is stopped is moved to the register 123. However, the data held in the register 121 is written to the temporary register 124 in a timing in which the stop signal S1 is sent. Data held in the register 123 when the operation of the CPU 11 is stopped, that is, a result of the processing performed by the combinational logic network 122 is written to the temporary register 125. During a normal operation, the restoring signal LS is sent to the selectors 128 and 129 so as not to select outputs of the temporary registers 124 and 125.

In a case where debugging of the CPU 11 is completed to bring the debug canceling signal S3 into the significant condition and to reactivate the video decoder 12B, the restoring signal LS is brought into the significant condition to input the outputs of the temporary registers 124 and 125 to the registers 121 and 123, thereby restoring the internal state of the video decoder 12B to the internal state obtained when the operation of the CPU 11 is stopped.

It is needless to say that the above-mentioned structure can also be applied to modules other than the video decoder, for example, an audio decoder, an IO processor and the like. In that case, even if the modules have a variation in a time taken from the setting of the stop signal S1 to the significant condition to the stop of the operation, the internal states of all the modules can be returned to a time that the stop signal S1 was brought into the significant condition and the modules can be reactivated irrespective of the variation. Thus, it is possible to prevent disorders from being caused on reactivation of the audio image processor.

While the example in which the temporary registers 124 and 125 are connected to the registers 121 and 123 provided before and after the combinational logic network 122 has been described above, it is needless to say that the temporary register is connected to each register to write the output of the temporary register to the corresponding register through a selector because a plurality of combinational logic networks and registers are provided as in the foregoing.

<A-5. Characteristic Function and Effect>

According to the first embodiment of the present invention described above, the debug control circuit is provided. The debug control circuit serves to know a debug request sent from each module and a debug accepting state of the module to send a stop signal to each module, and to output a stop detecting signal for informing the outside that all the modules stop operations on receipt of the stop signal. Therefore, a debugging work for a stored program can be performed after confirming that the operations of all the modules are stopped. It is possible to prevent the module from being broken when the debugging work is performed in a state in which the module does not stop the operation.

By taking the arm condition and the disarm condition into consideration in addition to the trigger condition, more complicated stop conditions can be set to deal with a case where operations linked between the modules are performed.

In modules other than the CPU such as the video decoder and the like, the temporary register is arranged in a succeeding stage of the generally provided register. Consequently, data can be retained when the stop signal is brought into the significant condition, and the internal state of each module obtained when the stop signal is brought into the significant condition can be known.

In the modules other than the CPU such as the video decoder and the like, the temporary register is arranged in the succeeding stage of the generally provided register to retain data obtained when the stop signal is brought into the significant condition, and the data is written to the generally provided register when the video decoder is to be reactivated. Consequently, it is possible to restore the internal state of the video decoder to the internal state obtained when the stop signal is brought into the significant condition, that is, the CPU stops the operation. Therefore, when the video decoder is reactivated, an instruction sent from the CPU coincides with the internal state of the video decoder so that it is possible to prevent the data or operation instruction sent from the CPU from being ignored to continue a wrong operation or to cause hang-up.

It is needless to say that the data obtained when the stop signal is brought into the significant condition may be retained by adding the same structure to the CPU.

<B. Second Embodiment>
<B-1. Structure of Device>

In the debug control circuit 17 of the audio image processor according to the first embodiment of the present invention described above, the trigger condition signal S13 is input to the OR gate G3, and the output of the OR gate G3 is brought into the significant condition so that the stop signal S1 is brought into the significant condition if at least one module brings the trigger condition signal S13 into the significant condition. The stop signal S1 may be brought into the significant condition under more complicated conditions. A structure of a debug control circuit 17A provided for that purpose is shown in FIG. 5.

Figure 5:
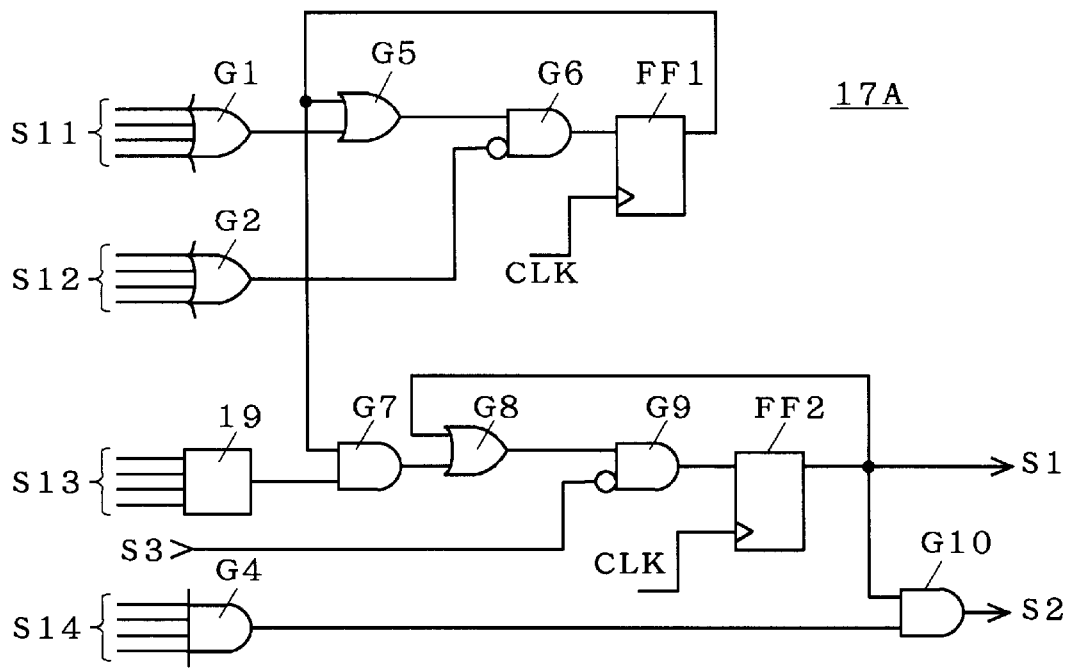
FIG. 5 is a diagram illustrating a partial structure of a semiconductor device according to a second embodiment of the present invention.

In FIG. 5, a trigger condition signal S13 output from each module is input to a logical operation circuit (a first circuit) 19. The logical operation circuit 19 can perform a logical operation for the input trigger condition signal S13, thereby changing an output according to a combination of the trigger condition signal S13, that is, a combination of a state of a module.

<B-2. Operation>

For example, in a case where it should be set that debugging is performed when a video decoder 12 executes a predetermined specific step of processing data and an audio decoder 13 executes a predetermined specific step of processing data at the same time, a logical operation is constituted in such a manner that an output of the logical operation circuit 19 is brought into a significant condition if the trigger condition signals S13 which are in the significant condition are simultaneously output from the video decoder 12 and the audio decoder 13. Consequently, the stop signal S1 can be brought into the significant condition to stop an operation of each module.

Furthermore, in a case where it should be set that the debugging is performed when an IO processor 14 executes a step of inputting data and a program stored in a CPU 11 executes an instruction having a predetermined specific address at the same time, a logical operation is constituted in such a manner that the output of the logical operation circuit 19 is brought into the significant condition if the trigger condition signals S13 which are in the significant condition are simultaneously output from the IO processor 14 and the CPU 11. Consequently, the stop signal S1 can be brought into the significant condition to stop the operation of each module. The logical operation of the logical operation circuit 19 can optionally be changed by an instruction sent from the outside, and can deal with various debug patterns.

<B-3. Structure and Operation of Logical Operation Circuit>

Figure 6:
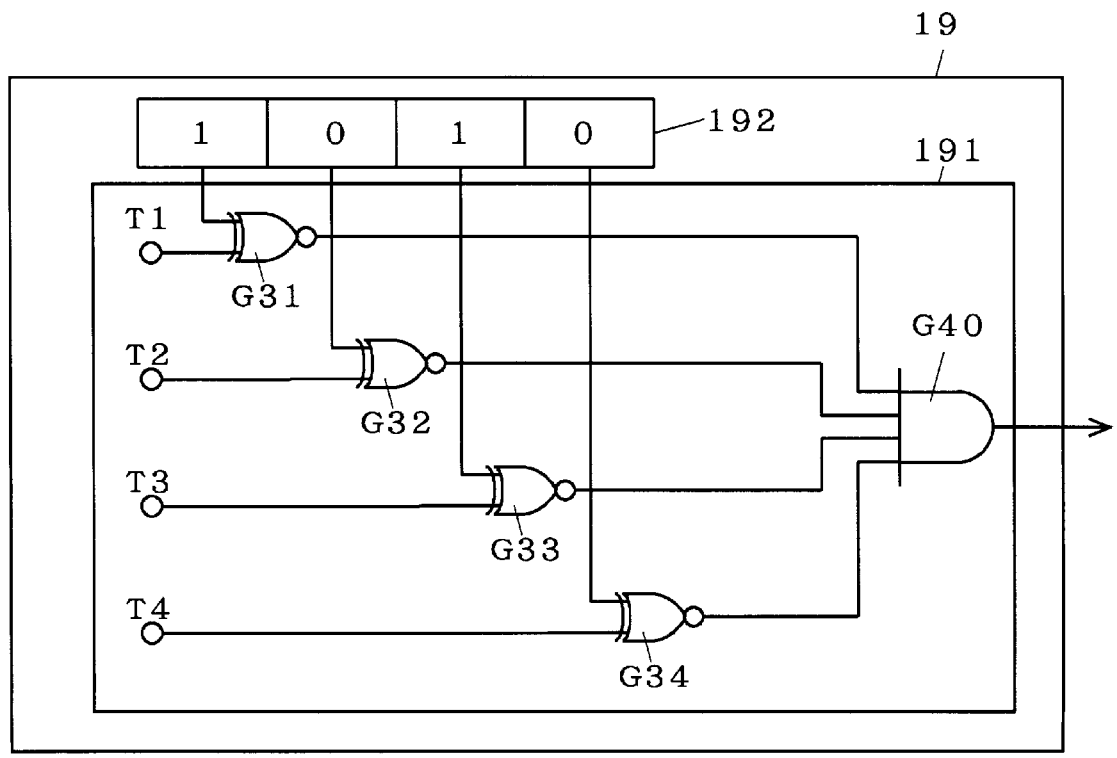
FIG. 6 is a diagram illustrating a partial structure of the semiconductor device according to the second embodiment of the present invention.
Figure 7:
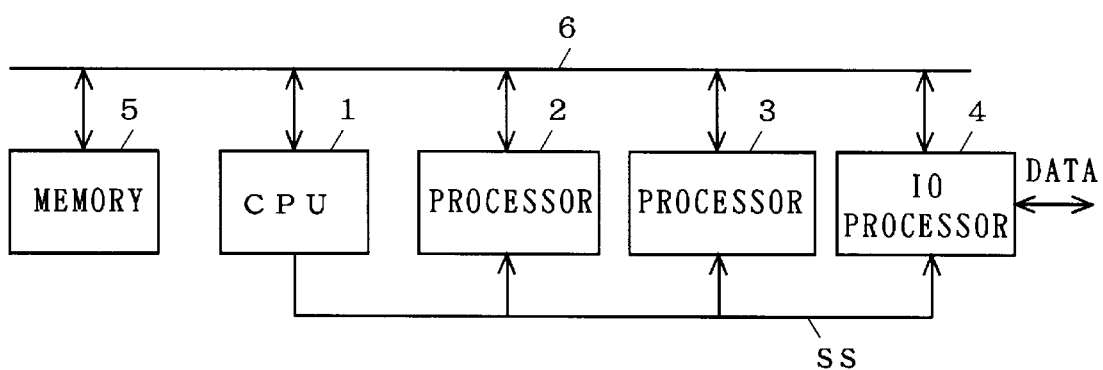
FIG. 7 is a block diagram illustrating a whole structure of a semiconductor device according to the background art.

Next, an example of a structure of the logical operation circuit 19 will be described with reference to FIG. 6. As shown in FIG. 6, the logical operation circuit 19 is generally divided into an operation part 191 and a logical value setting register 192.

The operation part 191 includes four EX (exclusive) NOR gates G31 to G34, and an AND gate G40 having an input to which outputs of the EXNOR gates G31 to G34 are connected. A serial in parallel out shift register is used for the logical value setting register 192. To respective inputs of the EXNOR gates G31 to G34 are connected an output of a data holding element (for example, a flip-flop circuit) of the logical value setting register 192 with a one-to-one correspondence and the trigger condition signal S13 sent from each module with a one-to-one correspondence.

With such a structure, in a case where each element of the logical value setting register 192 is set to "1010" sequentially from the left side in FIG. 6, an output of the AND gate G40, that is, an output of the logical operation circuit 19 is brought into the significant condition if input terminals T1 and T3 of the EXNOR gates G31 and G33 are brought into the significant condition, that is, "1" and input terminals T2 and T4 of the EXNOR gates G32 and G34 are brought into a nonsignificant condition, that is, "0".

By inputting another data from an input terminal T0 of the logical value setting register 192, a logical operation can optionally be changed to deal with various debug patterns.

A structure of the operation part 191 is not restricted to the above-mentioned structure. Also in a case where the same circuit system as a field programmable gate array (FPGA) put on the market is employed in place of the operation part 191, the same effects can be obtained. By varying a set value of a register, the field programmable gate array can optionally change a logical operation such as addition or integration of input data, subtraction of another input data from predetermined specific input data, or the like. Since a general field programmable gate array is used, its detailed description will be omitted.

<B-4. Variant>

By using the above-mentioned logical operation circuit 19 in place of the OR gates G1 and G2 for receiving the arm condition signal S11 and the disarm condition signal S12 respectively, more complicated arm conditions and disarm conditions can be processed.

While the structure of the audio image processor has been taken as an example in the first and second embodiments according to the present invention described above, the present invention is not applied to only the audio image processor but to any system LSI including a plurality of processors. For example, the present invention can universally be applied by using the CPU 11 as a first processor and other processors controlled by the CPU 11 as second processors.

While the invention has been described in detail, the foregoing description is in all aspects illustrative and not restrictive. It is understood that numerous other modifications and variations can be devised without departing from the scope of the invention.

I claim:

1. A semiconductor device comprising:
    a first processor;
    at least one second processor for receiving and sending a signal from/to said first processor; and
    a debug control circuit for outputting a stop signal, to said first processor and said at least one second processor, to give an instruction for stop of an operation during debugging of programs stored in said first processor and said at least one second processor,
    said at least one second processor being controlled by said first processor and individually operating independently of said first processor,
    said first processor and said at least one second processor outputting a trigger signal which requires to output said stop signal to said debug control circuit when performing predetermined first specific operations based on said programs stored in said first processor and said at least one second processor, and outputting a stop detecting signal indicative of stop to said debug control circuit when said operation is stopped in response to said stop signal, and
    said debug control circuit outputting said stop signal on receipt of said trigger signal, and outputting a stop notice signal indicative of stop of all of said first processor and said at least one second processor if said stop detecting signal is output from all of said first processor and said at least one second processor.

2. The semiconductor device according to claim 1, wherein said first processor and said at least one second processor further have a function of bringing, into a significant condition, and outputting one of a trigger excluding signal negating that said stop signal is brought into a significant condition and a trigger accepting signal permitting said stop signal to be brought into a significant condition to said debug control circuit when a predetermined second specific operation other than said first specific operation is performed on the basis of programs stored in said first processor and said at least one second processor, and
    said debug control circuit further has functions of:
    negating that said stop signal is brought into a significant condition even if it receives said trigger signal in a case where said trigger excluding signal is input; and
    bringing said stop signal into a significant condition on receipt of said trigger signal in a case where said trigger accepting signal is input.

3. The semiconductor device according to claim 2, wherein said debug control circuit comprises:
    a first circuit for receiving said trigger signals output from said first processor and said at least one second processor, and for bringing, into a significant condition, and outputting a first signal if at least one of said trigger signals is in a significant condition;
    a second circuit for receiving said trigger accepting signals output from said first processor and said at least one second processor, and for bringing, into a significant condition, and outputting a second signal if at least one of said trigger accepting signals is in a significant condition;
    a third circuit for receiving said trigger excluding signals output from said first processor and said at least one second processor, and for bringing, into a significant condition, and outputting a third signal if at least one of said trigger excluding signals is in a significant condition;
    a fourth circuit for receiving said stop detecting signals output from said first processor and said at least one second processor, and for bringing, into a significant condition, and outputting a fourth signal if all of said stop detecting signals are in a significant condition;
    a fifth circuit for receiving said second and third signals, and for outputting a trigger acceptance deciding signal which is brought into a significant condition when said second signal is in a significant condition and into a nonsignificant condition when said third signal is in a significant condition;
    a sixth circuit for receiving said first signal and said trigger acceptance deciding signal, and for bringing, into a significant condition, and outputting said stop signal when both said first signal and said trigger acceptance deciding signal are in a significant condition; and
    a seventh circuit for receiving said stop signal and said fourth signal, and for bringing, into a significant condition, and outputting said stop notice signal when both said stop signal and said fourth signal are in a significant condition.

4. The semiconductor device according to claim 2, wherein said debug control circuit comprises:

a first circuit for receiving said trigger signals output from said first processor and said at least one second processor, for performing an operation of coincidence of said trigger signal with a preset value, and for bringing, into a significant condition, and outputting a first signal if said trigger signal is coincident with said preset value;

a second circuit for receiving said trigger accepting signals output from said first processor and said at least one second processor, and for bringing, into a significant condition, and outputting a second signal if at least one of said trigger accepting signals is in a significant condition;

a third circuit for receiving said trigger excluding signals output from said first processor and said at least one second processor, and for bringing, into a significant condition, and outputting a third signal if at least one of said trigger excluding signals is in a significant condition;

a fourth circuit for receiving said stop detecting signals output from said first processor and said at least one second processor, and for bringing, into a significant condition, and outputting a fourth signal if all of said stop detecting signals are in a significant condition;

a fifth circuit for receiving said second and third signals, and for outputting a trigger acceptance deciding signal which is brought into a significant condition when said second signal is in a significant condition and into a nonsignificant condition when said third signal is in a significant condition;

a sixth circuit for receiving said first signal and said trigger acceptance deciding signal, and for bringing, into a significant condition, and outputting said stop signal when both said first signal and said trigger acceptance deciding signal are in a significant condition; and a seventh circuit for receiving said stop signal and said fourth signal, and for bringing, into a significant condition, and outputting said stop notice signal when both said stop signal and said fourth signal are in a significant condition.

5. The semiconductor device according to claim 4, wherein said first circuit comprises:

a register to which said preset value is input; and an operation part for comparing said trigger signal with said preset value, said operation part having:
a plurality of exclusive NOR gates provided on said first processor and said at least one second processor with a one-to-one correspondence; and
an AND gate for receiving outputs of said exclusive NOR gates, said register having a plurality of data holding elements provided on said first processor and said at least one second processor with a one-to-one correspondence, and said exclusive NOR gates receiving said trigger signals from said first processor and said at least one second processor with a one-to-one correspondence, and receiving outputs of said data holding elements of said register with a one-to-one correspondence.

6. The semiconductor device according to claim 1, wherein said at least one second processor has:

at least one pair of a first register for temporarily holding data to be processed, and a combinational logic network connected to said first register for receiving and processing said data; and a second register connected to an output of said first register in parallel with said combinational logic network, said data transferred from said first register to said combinational logic network being also written to said second register.

7. The semiconductor device according to claim 6, further comprising a selector provided in a path transmitting said data to said first register, for receiving an output of said second register together with said data to select and output one of them, said data written to said second register being written as restored data to said first register in response to a restoring signal sent in a predetermined timing.

* * * * *